(12) United States Patent
Chiarulli et al.

(10) Patent No.: US 7,519,359 B2
(45) Date of Patent: Apr. 14, 2009

(54) VOICE TAGGING OF AUTOMATED MENU LOCATION

(75) Inventors: Nicholas C. Chiarulli, Manchester, NJ (US); Neal C. Foster, Manalapan, NJ (US); Padmanabha D. Rajagopalan, East Windsor, NJ (US)

(73) Assignee: Motorola, Inc., Schaumburg, IL (US)

( * ) Notice: Subject to any disclaimer, the term of this patent is extended or adjusted under 35 U.S.C. 154(b) by 474 days.

(21) Appl. No.: 11/241,841

(22) Filed: Sep. 30, 2005

(65) Prior Publication Data

US 2007/0077919 A1 Apr. 5, 2007

(51) Int. Cl.
*H04M 3/00* (2006.01)

(52) U.S. Cl. .................. 455/418; 455/412.1; 455/456.1; 379/37; 379/45

(58) Field of Classification Search .................. 455/518, 455/456.1, 412; 379/37, 45
See application file for complete search history.

(56) References Cited

U.S. PATENT DOCUMENTS

| | | | |
|---|---|---|---|
| 6,473,038 B2 | 10/2002 | Patwari et al. | |
| 6,597,915 B2 | 7/2003 | Shi et al. | |
| 6,658,414 B2 | 12/2003 | Bryan et al. | |
| 6,704,576 B1* | 3/2004 | Brachman et al. | ........... 455/503 |
| 6,714,635 B1 | 3/2004 | Adams et al. | |
| 6,859,776 B1 | 2/2005 | Cohen et al. | |
| 2003/0032456 A1 | 2/2003 | Mumick et al. | |
| 2004/0032843 A1 | 2/2004 | Schaefer et al. | |
| 2004/0071275 A1 | 4/2004 | Bowater et al. | |
| 2004/0185890 A1 | 9/2004 | Drozt et al. | |
| 2004/0215702 A1 | 10/2004 | Hamasaki, Jr. et al. | |
| 2005/0097189 A1 | 5/2005 | Kashi | |
| 2005/0143135 A1 | 6/2005 | Brems et al. | |
| 2006/0035659 A1* | 2/2006 | Yoon et al. | ................... 455/518 |
| 2006/0046759 A1* | 3/2006 | Yoon et al. | ................... 455/518 |
| 2006/0089167 A1* | 4/2006 | Idnani | ......................... 455/518 |
| 2006/0120516 A1* | 6/2006 | Armbruster et al. | ........... 379/37 |
| 2006/0205416 A1* | 9/2006 | Kayzar et al. | ............. 455/456.1 |
| 2006/0270430 A1* | 11/2006 | Milstein et al. | ............. 455/518 |

FOREIGN PATENT DOCUMENTS

WO WO 02/087172 A1 10/2002

\* cited by examiner

*Primary Examiner*—Danh C Le
(74) *Attorney, Agent, or Firm*—Gary J. Cunningham; Daniel R. Collopy

(57) ABSTRACT

A method is provided for efficiently accessing information 418, 510 from an automated menu based system 314 using a wireless communications device 102 and deploying services by utilizing the PTT contact list. Having a formatted PTT contact which connects to a voice portal or directly to the desired content from the handset itself enables carriers as well as users the ability to subscribe to information services with minimal setup, user interaction, and in a personalized manner. The method comprises selecting a contact 404,506 from at least one contact 402 in the wireless communications device 102; establishing a PTT communication to a server 202 to access an automated menu based information database 314 containing the information; selecting an option 412, 506 pointing to the information from two or more options 410, 506 voiced from the automated menu based information database 314; receiving 414, 510 the information by the wireless communications device 102; tagging 416, 512 the option selected by a voice response; and updating 420 the list of contacts in the wireless communication device to include the option tagged.

12 Claims, 8 Drawing Sheets

206

US 7,519,359 B2

VOICE TAGGING OF AUTOMATED MENU LOCATION

FIELD OF THE INVENTION

The present invention generally relates to sending and receiving data over a voice communications channel, and more particularly to efficiently accessing information from an automated menu based system using a push-to-talk solution.

BACKGROUND OF THE INVENTION

Mobile communication devices, such as cellular telephones and personal digital assistants (PDAs), are becoming ubiquitous throughout much of the world. Indeed, many people consider such devices an essential part of modem living. Cellular technology provides a large proportion of wireless communications through technologies such as code division multiple access (CDMA), time division multiple access (TDMA), Global System for Mobile Communications (GSM), and other standard cellular protocols. Push-to-talk (PTT) technology, which is a form of dispatch voice communications, is known and commonly used for voice communications. PTT technology, for example, is used as a part of the Integrated Dispatch enhanced Network (iDEN) communications systems sold and provided by Motorola, Inc. of Schaumburg, Ill. Dispatch voice communications together with cellular communications has been developed. This combination of technologies is known as Push-to-Talk over Cellular (PoC) communications systems.

Spurring the adoption of these mobile communication devices by consumers is a wide range of functionality now being designed into the devices. For example, mobile communication devices now are available which include computer applications, Internet access, text messaging, and integrated digital cameras.

In a like manner, developers have been creating applications for use with non-mobile systems. Examples include automated dial in services such as movie presentation times, sporting event scores, stock market reports, and automobile traffic reports. An Interactive Voice Response (IVR) is an automated telephone information system that speaks to the caller with a combination of fixed voice menus and data extracted from databases in real time. The caller responds by pressing digits on the telephone or speaking words or short phrases. Typically, a user with a personal digital assistant, cell phone, wired phone, or computer based phone would call a phone number to access a menu based system which contains a tree menu structure with multiple nodes. The user would progress through the menu to the desired information by manually entering a DTMF tone or a spoken word or words at each level to move to the next level of the menu.

However, every time the user wishes to access the menu based system, the user would be required to manually enter the DTMF tones or spoken words to progress to the next level of the tree, and eventually to the desired information. This process is time consuming and potentially frustrating to the user since the tree based menu may comprise many levels and require the user to enter several responses before the desired information is obtained as well as the tree structure changing, requiring users to listen to the new menu structure. Traditional IVR systems allow users to dial in (1-800-555-TELL) and select Sports, Baseball, American or National League, then select the team name. These systems have increased their intelligence and usability by adding a favorite's option which requires setting up a user account, password, and answering setup questions. Once in the system you need to navigate to favorites wait for prompt and then navigate through your favorites using voice. Enabling new services require new dial in numbers and extensible marketing expense to promote users to recall the number to dial to retrieve access the new service. Additionally, a method of automatically transferring a phone number or location identifier of the desired menu location or node, desired content, or the desired information to the personal digital assistant or cell phone does not exist.

Accordingly, it is desirable to provide a method of accessing the desired information from a menu based system directly from the handset without manually entering DTMF tones or spoken words. It is desirable to provide the ability to add new and modify existing entry points into a menu based system without user input. Furthermore, other desirable features and characteristics of the present invention will become apparent from the subsequent detailed description of the invention and the appended claims, taken in conjunction with the accompanying drawings and this background of the invention.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

Figure 1:
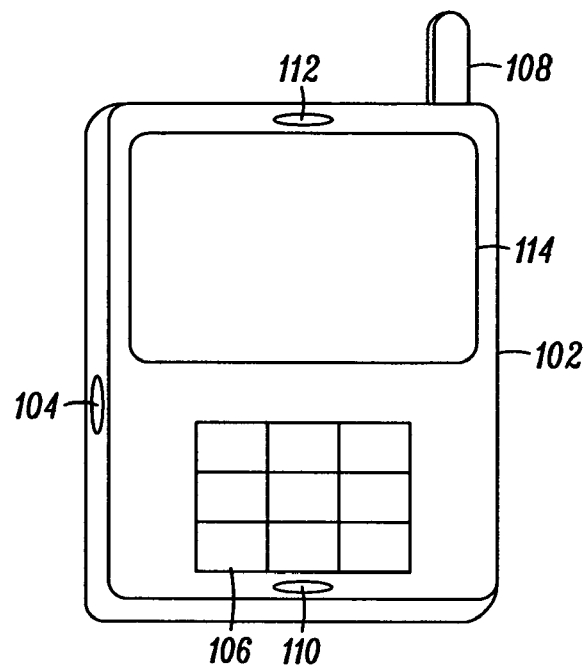
FIG. 1 is an overall system diagram illustrating one embodiment of a mobile communication network in accordance with an exemplary embodiment.

The following detailed description of the invention is merely exemplary in nature and is not intended to limit the invention or the application and uses of the invention. Furthermore, there is no intention to be bound by any theory presented in the preceding background of the invention or the following detailed description of the invention.

The term program, software application, and the like as used herein, are defined as a sequence of instructions designed for execution on a computer system. A program, computer program, or software application may include a subroutine, a function, a procedure, an object method, an object implementation, or executable application, an applet, a servlet, a source code, an object code, a shared library/dynamic load library, and/or other sequences of instructions designed for execution on a computer system.

A method for providing information from an automated menu based information database residing on a server to a wireless communications device is described. The method shall provide direct or one-shot access to the desirable information. For example by adding a contact that would directly connect a user to desirable content. It is desirable to provide the user with a mechanism to modify (add/remove/change) which information is available via direct access. The modification of information should be done with minimal user interaction on the personal digital assistant or cell phone. It is desirable to suggest new content that the user can get via direct access. For example, by pushing special contacts into a handset, carriers would be able to release new services by adding new Push-to-Ask (PTA) contacts in a subscribers Push-to-Talk (PTT) contact list which connects the user to information and new services.

The contact can be a live contact, such that it reflects real-time some of the information that it provides direct access to. For e.g., the contact can display the current score of a users favorite sports team match. This contact will also be used for direct access to the complete information about that team found in the menu based system.

Using such a mechanism to add IVR entries into a users PTT contact list allows a user to customize their PTT contact list with contacts that directly access desirably information in the wireless communications device. The mechanism provided ensures that this customization can be done with minimal effort. The location of the information is added to the user's wireless device so future access may be made directly to the information, thereby avoiding having to go through the menu structure. Retrieving the information comprises of selecting a contact from at least one contact in the wireless communications device and the information is transmitted to the wireless communications device.

Communicating with the PTT group list management server (GLMS) server can be achieved for example by using any scripting language that supports the HTTP command used to send text to a Web server for processing (POST) method, cookies, and the documented extensible markup language (XML) application programming interface (API's) to add PTT contacts to an individual's PTT contact list. Users can connect to interactive voice response (IVR) systems by pressing the PTT button on a Push-To-Ask (PTA) contact. By encoding the PTA contact in a defined PTA format the script can add it to a users contact list using the XML API. This will use PTT's existing mechanism for pushing of the contact to a PTA enabled handset. PTA contacts can be differentiated from PTT contacts. Taking the existing PTT contact limitations under consideration, a protocol has been defined to distinguish the PTT contacts from PTA contacts. The protocol for mapping the PTA contact to a MDN (valid phone number) shall use a combination of Unicode characters, digits, characters, etc. in the PTT contact name, as well as utilizing the PTT contact phone number.

It shall be possible for the handset to have a pre-configured number which can be modified to meet the carrier's needs as the direct dial in number. This number can be used as the main menu number or used to combine the information stored in the protocol. DTMF tones can be appended to the MDN using the pause feature within the handset. The DTMF tones shall be played as soon as the call is connected. The timer for the 'pause' can be optimized in the handset to decrease setup time.

To add a PTA contact, the Application Server will have a script that is triggered when a user desires to add a menu item (Sports) or content (Team) to their PTT contact list. This script will execute the login routing into the PTT GLMS server, add the contact then execute logout routine. The PTT server's natural behavior will propagate the new contact to the user's handset the next time the handset request a contact list update. The user shall be able to view the PTA contact and connect to the content (Team) by selecting the item from the PTT contact list. The PTA encoding shall be transparent to the user.

Referring to FIG. 1, an exemplary wireless (or mobile) communication device 102, for example a personal digital assistant having the PTT function, is shown. The wireless communication device 102 may also be referred to as a cellular phone, a mobile phone, handset, etc. The wireless communication device 102 may initiate a PTT communication by depressing a dedicated PTT button 104. Standard keys 106 (e.g., number, function, soft), an antenna 108, a microphone 110, a speaker 112, a display screen 114, and a jack (not shown) for an earpiece may also be included in the wireless communication device 102. Although a planer housing is shown for the wireless communication device 102, it should be understood that any type of housing, e.g., flip or clamshell, may be utilized. Information received by the wireless communication device 102 may be presented on one of or both of the speaker 112 and the display screen 114. An internal speakerphone (not shown) may be included for hands free operation.

There are at least two major forms of voice communication that are in widespread use, which are regular full duplex telephony, and half duplex dispatch calling, each facilitating at least one of two modes, voice and non-voice. Dispatch calling includes both one-to-one "private" calling and one-to-many "group" calling. Non-voice mode communication includes SMS, chat, such as Instant Messaging, and other similar communications. The exemplary embodiment described herein comprises a wireless communication device 102 communicating through any known mobile phone network (e.g., GSM, CDMA, TDMA, etc.), and includes push-to-talk application software. In the exemplary embodiment, this software may also be written in one of C, C++, Qualcomm BREW®, Symbian or Microsoft PTT programming languages, for example.

Figure 2:
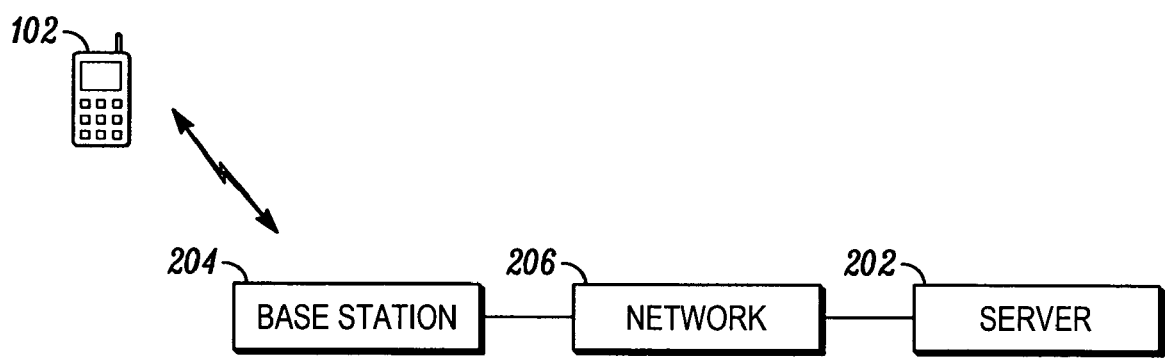
FIG. 2 is a hardware block diagram illustrating an exemplary embodiment of a wireless device.

FIG. 2 is a block diagram showing the wireless communication device 102 communicating with server 202 via a base station 204 and a network 206. As is understood by those in the industry, a plurality of base stations exist throughout a geographical region for communicating with a plurality of the wireless communication devices 102.

Figure 3:
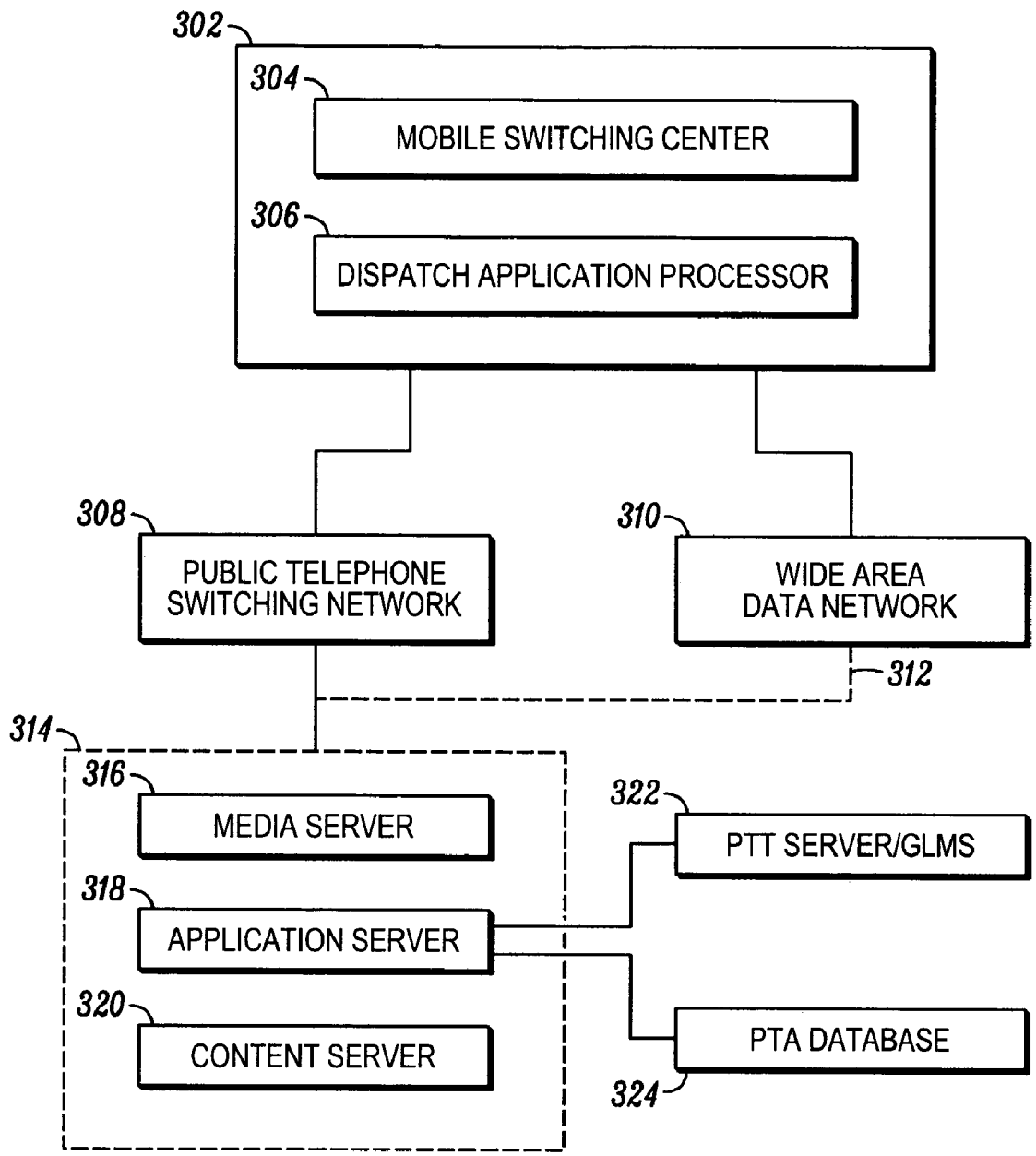
FIG. 3 is a diagram of user directed operations of the exemplary embodiment.

Referring to FIG. 3, the network 206 includes a central office 302 which includes call processing equipment for facilitating communication among mobile communication devices 102 and between mobile communication devices 102 and parties outside the communication system infrastructure, such as mobile switching center 304 for processing mobile telephony calls, and a dispatch application processor 306 for processing dispatch or half duplex communication.

The network 206 is further operably connected to a public telephone switching network (PTSN) 308 to connect calls between mobile communication devices within the communication system infrastructure and telephone equipment outside the system. Furthermore, the central office 302 may provide connectivity to a wide area data network (WAN) 310, which may include connectivity to the Internet. These signals are forwarded to the interactive voice response (IVR) system 314, which includes a media server 316, an application server 318, and content 320, which comprises information, such as movie presentation times, sporting event scores, stock market reports, and automobile traffic reports that may be accessed by dialing a locater identification number such as a phone number or session initiation protocol (SIP) uniform resource identifier (URI). A PTT server 322 and a PTA database 324 are connected to the application server 318. Upon accessing the IVR system 314, a response is received including a number of selectable options. The user, by a voice response, would select one of these options, which may then result in a number of further options being received. This process of option selection may occur several times until information desired by the user is presented on the wireless communications device 102. Additional functionality in accordance with the exemplary embodiment will be described hereinafter.

While the communications from the user to the automated menu based information database could be by touch tones or text messages, it preferably would be accomplished by spoken words using natural speech recognition in an IVR system. Such speech recognition software is widely being used in many application such as when making airline reservations or obtaining flight times, and in accessing information from a bank. The interaction of the voice prompts and user input is guided by a voice application that in turn is executed by the IVR system. These voice applications may be written in, for example, C/C++ for phone applications and voice extensible mark up language for internet compatibility.

Figure 4:
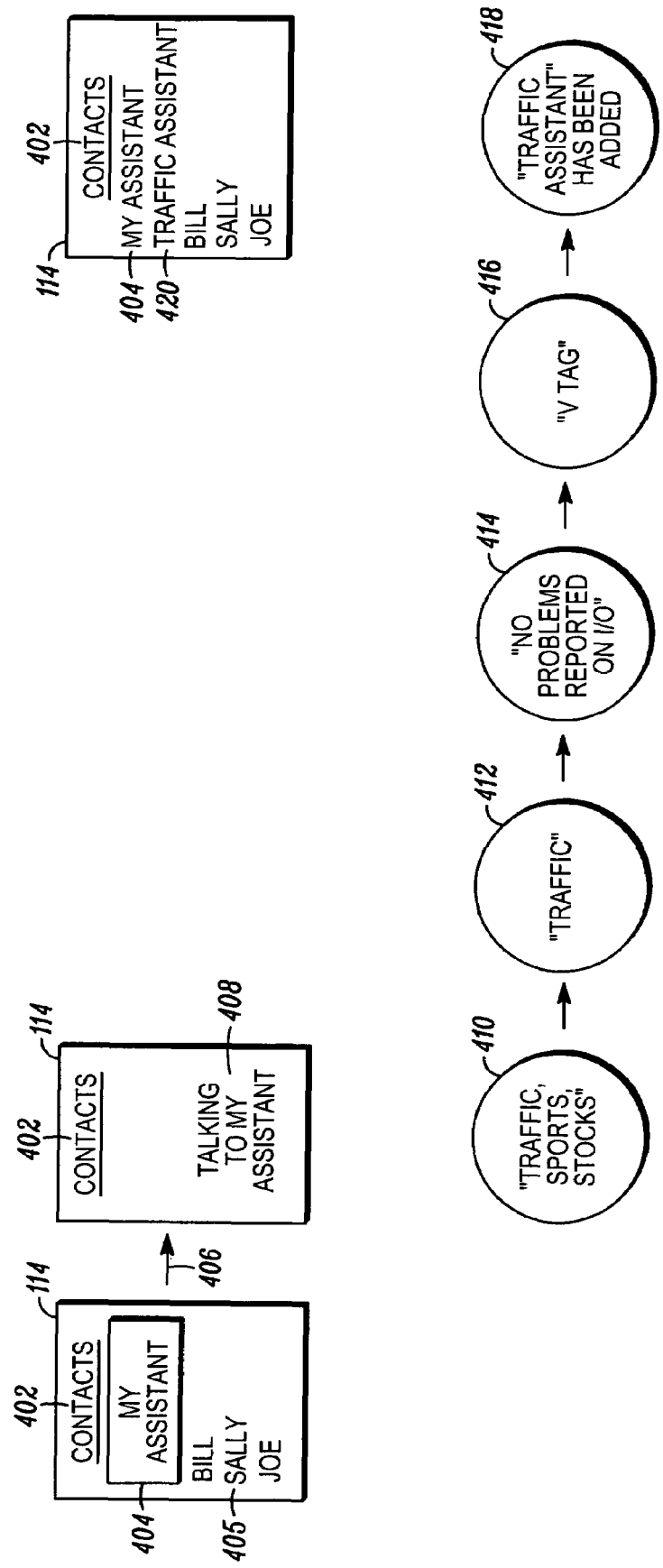
FIG. 4 is a flow chart illustrating the method of the exemplary embodiment.

A method illustrating the steps taken by a user for an exemplary embodiment is shown in FIG. 4 for use on the personal digital assistant (PDA) 102. The display 114, as an example of one presentation, contains a listing of "Contacts" 402, including "My Assistant" 404 and a list of names 405. "My Assistant" 404 is linked by phone number or URI, for example, to the automated menu based information system 314. If the user desired to access information from the automated menu based system 314, the user would select 406 "My Assistant" 404 from the screen 114 by cursoring to the "My Assistant" and pressing the PTT button 104. "Talking to My Assistant" 408 or a similar dialog would then appear on the screen 114. The automated menu based information system 314, referred to herein at times as the "Assistant" or "My Assistant", would verbally respond 410 with a list of selections, for example, "Sports", "Movies", or "Traffic". The user would push the PTT button 104 and say "Traffic" 412, for example. The Assistant would respond (not shown) with, for example, the name of a city, an area of a city, or a freeway number. This process of the user pushing the PTT button 104 to speak a key word and the Assistant responding with additional optional selections would continue until the menu reached an end point desired by the user, resulting in the status of traffic 414 at a specific location being provided to the user.

Figure 9:
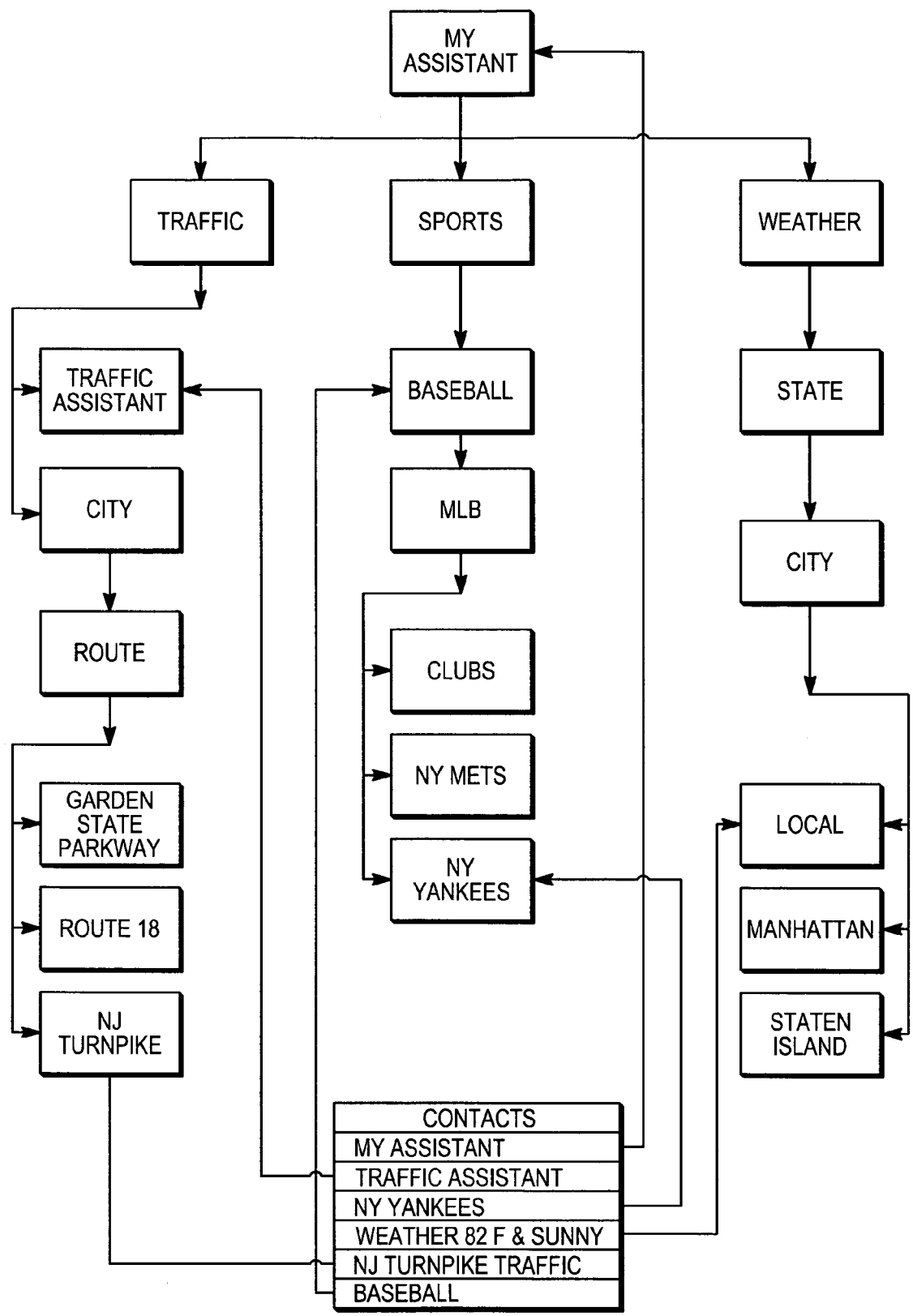
FIG. 9 is a tree structure of selectable options showing linking to the wireless device.

In accordance with the exemplary embodiment, the user would then press the PTT button 104 and say, for example, "vTag"™ 416 (voice tag). Any predetermined spoken word could be used for this tagging operation; however, the word should be understandable by the Assistant so it may be recognized when stated by the user. Optionally, and in response to the spoken word "vTag", the Assistant would say, for example, "Your 'Traffic Assistant' has been added to your contact list" 418. The screen 114 would update and then display the direct link as "Traffic Assistant" 420. The PTA Traffic Assistant contact points to the information mode of the tree structure (FIG. 9). The user may then select "Traffic Assistant" 420 from the wireless communication device 102 and press the PTT button 104 when it is desired to hear a report of the traffic at that desired location. This mechanism uses minimal user input and instead of having to progress through the multiple steps of the menu as the case when the user entering the system at "My Assistant" 404.

Figure 5:
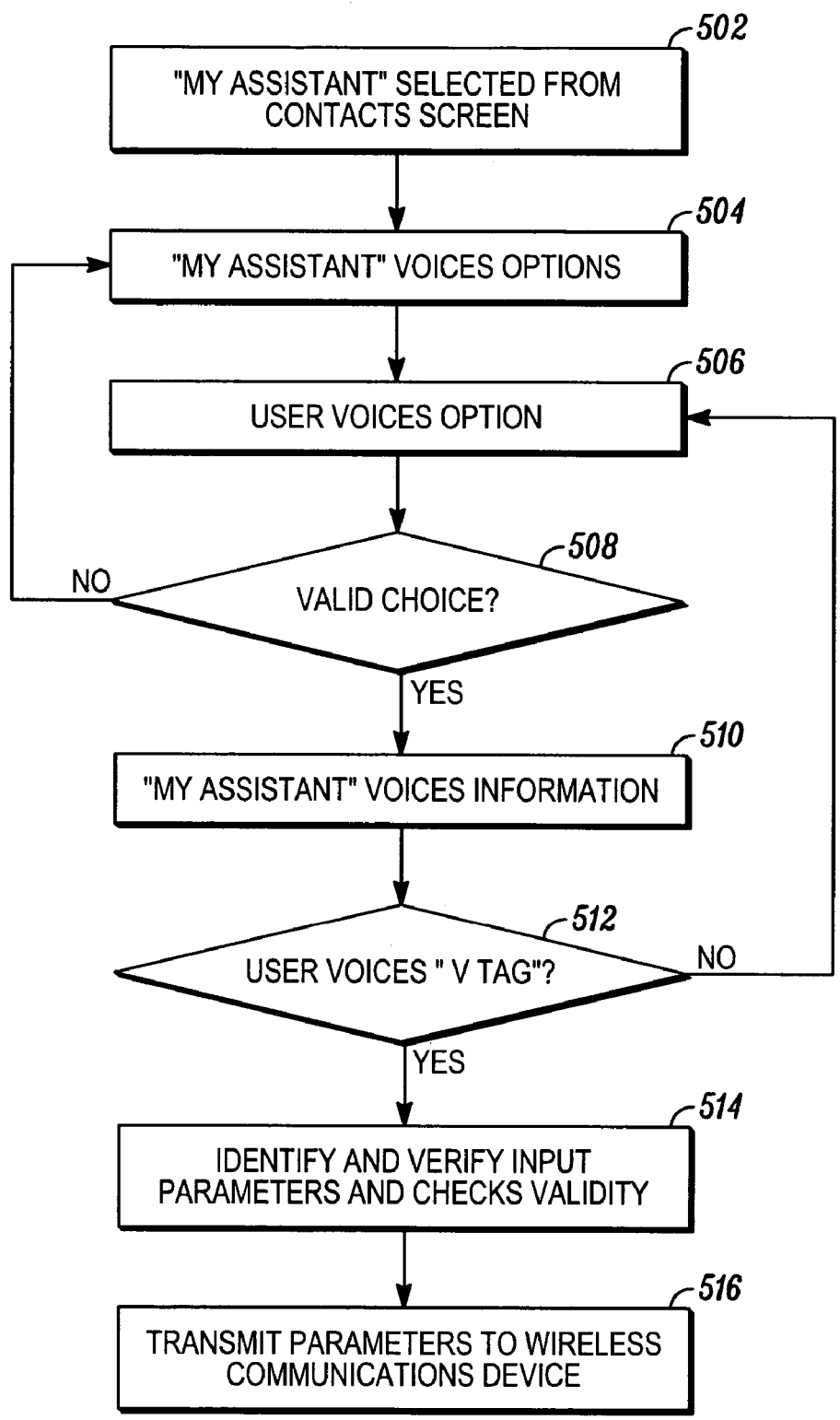
FIG. 5 is a flow chart illustrating the method for a user to establish direct access via a link on the wireless device to information.

Referring to FIG. 5, a more detailed flow chart of this method, representing the user navigating through menus and using the command vTag to add the content into the PTT contact list, comprises the user selecting 502 "My Assistant" from the contact screen 114 by pushing the PTT button 104. The automated menu bases information system 314 ("My Assistant") would speak 504 a list of options with a computer generated, or recorded, voice. The user would then press the PTT button 104 and speak 506 one of the options (such as "Traffic" in the exemplary embodiment). If My Assistant does not recognize 508 the user's spoken word, it prompts the user to re-try. If the spoken word is recognized, the screen 114 progresses to the next spoken menu item(s). If the next menu item is not the last item in the tree structure, further options are presented and selected as in steps 504, 506 until the desired information is presented 510 (FIG. 9 illustrates an exemplary tree structure and contact list interface). The user may then speak "vTag" 512, thereby instructing the application to add the current information link to the user's device.

When a user says the "vTag" 512 command, the application server communicates with the PTT server using existing XML API's and adds a formatted PTT contact, known as a Push-to-Ask (PTA) contact. When a PTA contact is added to the users PTT contact list, the PTT server 516 uses an existing mechanism to push the PTA formatted contact back to the PTA enabled handset. Concurrently or consecutively, the PTA contact mapping is stored in a database 514. The information stored in the database may include the following items: caller ID (identification), a tag name ("Traffic Assistant"), a locater identifier (phone number, uniform resource locater (URL), as well as other Meta data used for retrieval of the information link.

More specifically, the user selects a PTA contact from the PTT contact list. The handset 102 communicates with the IVR system 314 by placing a call using the Circuit Switched (CS) method or using IP based solution. The media server 316 renders the voice extensible markup language (VXML) from the applications server 318 and handles the users voice recognition commands (grammar) derived from the VXML page as well as plays the prompts (Text-to-Speech or pre-recorded). The application server 218 starts the PTA application and request the content from the content server 320 or requests the user's stored page, or v-Tag, from the PTA database. The content server 320 provides the updated content (sports, stocks, etc.) to the application server 328. When a user says the v-Tag command 416, the application server 318 communicates with the PTT server 322 using existing XML API's and adds a special formatted PTT contact, known as a PTA contact. When a user adds a PTA contact, the contact may need to be mapped to the information node or content in the content server 320 or use a direct SIP URI. The mapping of a PTA contact to the content is stored in the PTA Database 324. When a contact 420 is added to the users PTT contact list 402, the PTT server 322 uses an existing mechanism to push the PTA formatted contact back to the PTA enabled handset 102.

The PTA database 324 contains tables that are used to store information, for example, the users mobile directory number (MDN) and DTMF tones which correlate to links to the information nodes or content sources. One table of interest is the table called 'tag' and will be referred to as. 'TAG table'. The TAG table contains the fields necessary to complete the mapping.

Figure 6:
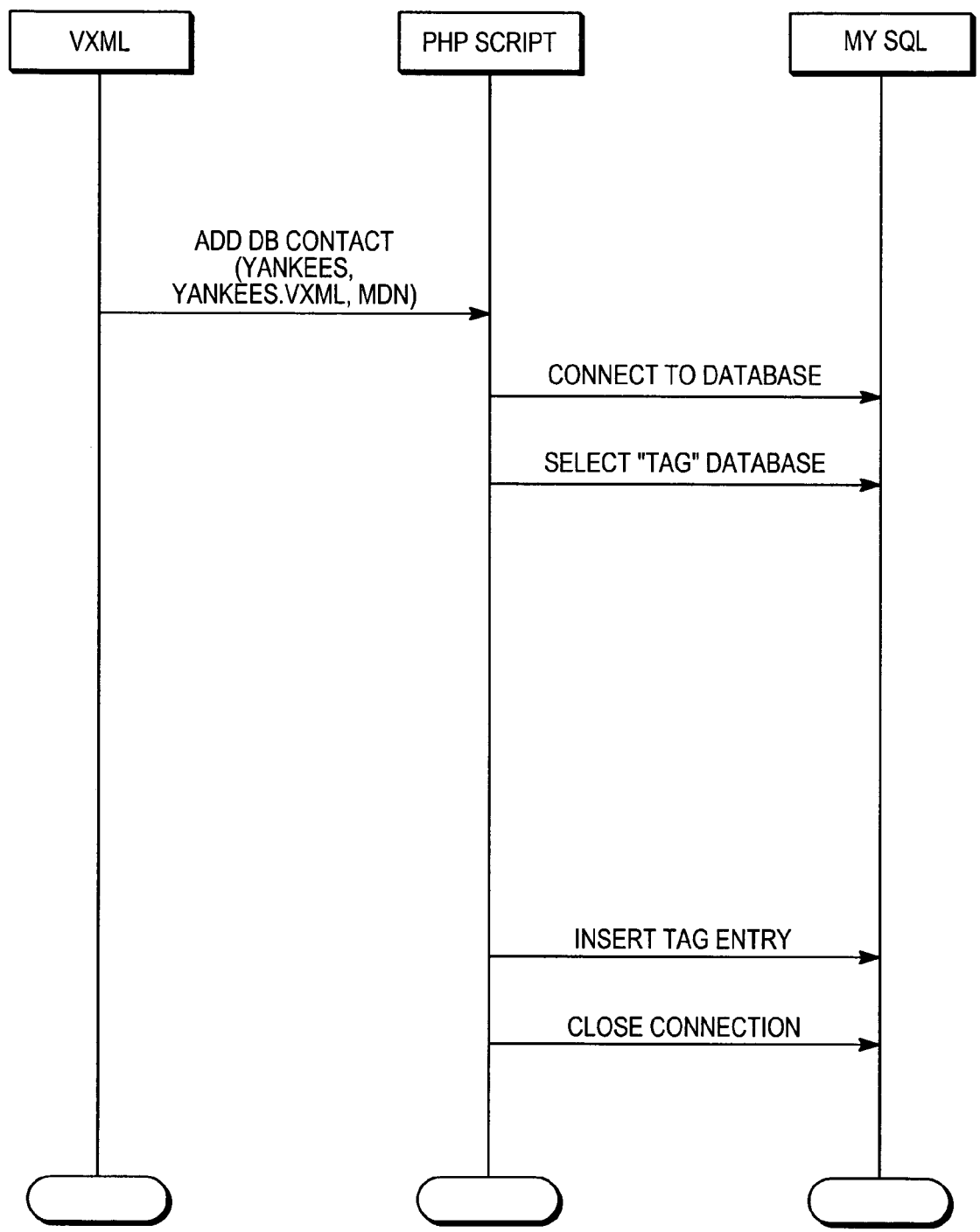
FIG. 6 is a message sequence diagram describing one of the techniques used to add the link to the users PTT contact list by interacting with the PTT server.

Referring to FIG. 6, a contact is added to the TAG table when a user adds a vTag to a content page. The VXML script may pass the MDN, URL, and contact name to be stored. The mapping technique shall enable the addition of new services independently from the DTMF tones.

The scripting language chosen to add a PTA contact is hypertext preprocessor (PHP), specifically using Client URL Library (CURL) Functions, which provide the ability to store cookies and HTTP POST mechanism that supports XML. The version of PHP currently available is PHP 4.3.11, though other scripting languages could be used.

Figure 7:
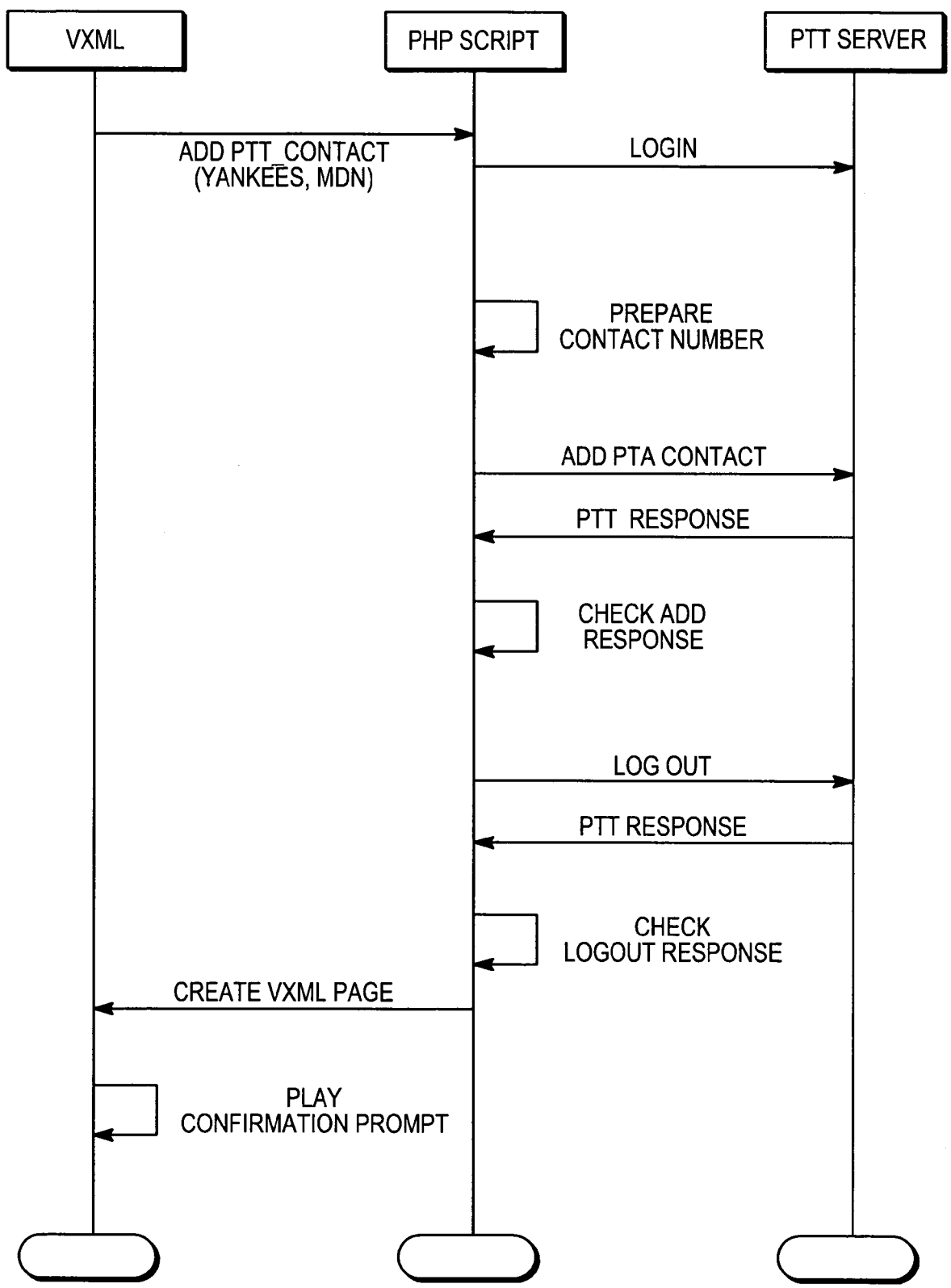
FIG. 7 is a message sequence diagram describing how the PHP script and PTT service interact.

FIG. 7 shows the interaction of the PHP script and the PTT server 322. The VXML script may pass the user's MDN (phone #), contact name, as well as the other information necessary to add the PTA contact.

To login to the PTT server, use the callerID of the user that called the VXML application and the password that is designated for adding PTA contacts. If the user changes their personal password then the PTA password is not affected.

/* the following is used to login */
<LOGIN MESSAGE: username, password>

To create the XML form to add the contact using the users phone number, the contact name, and the contact number:

/* the following is used to add a contact */
<ADD SUBSCRIBER MESSAGE: subscriber, MDN, contact, MDN>

To keep a valid session, the cookie from the login is used to post the XML form to the PTT server address. The response of the add request is parsed and stored if it was a success or failure. The XML form to logout of the PTT server is created to complete the transaction.

/* the following is used to log out */
<LOGOUT MESSAGE: username>

A logout is verified and the VXML page is provided to play the success/failure prompt depending on the response of the add request. After the prompt is played, either the main menu or the same page is presented.

Figure 8:
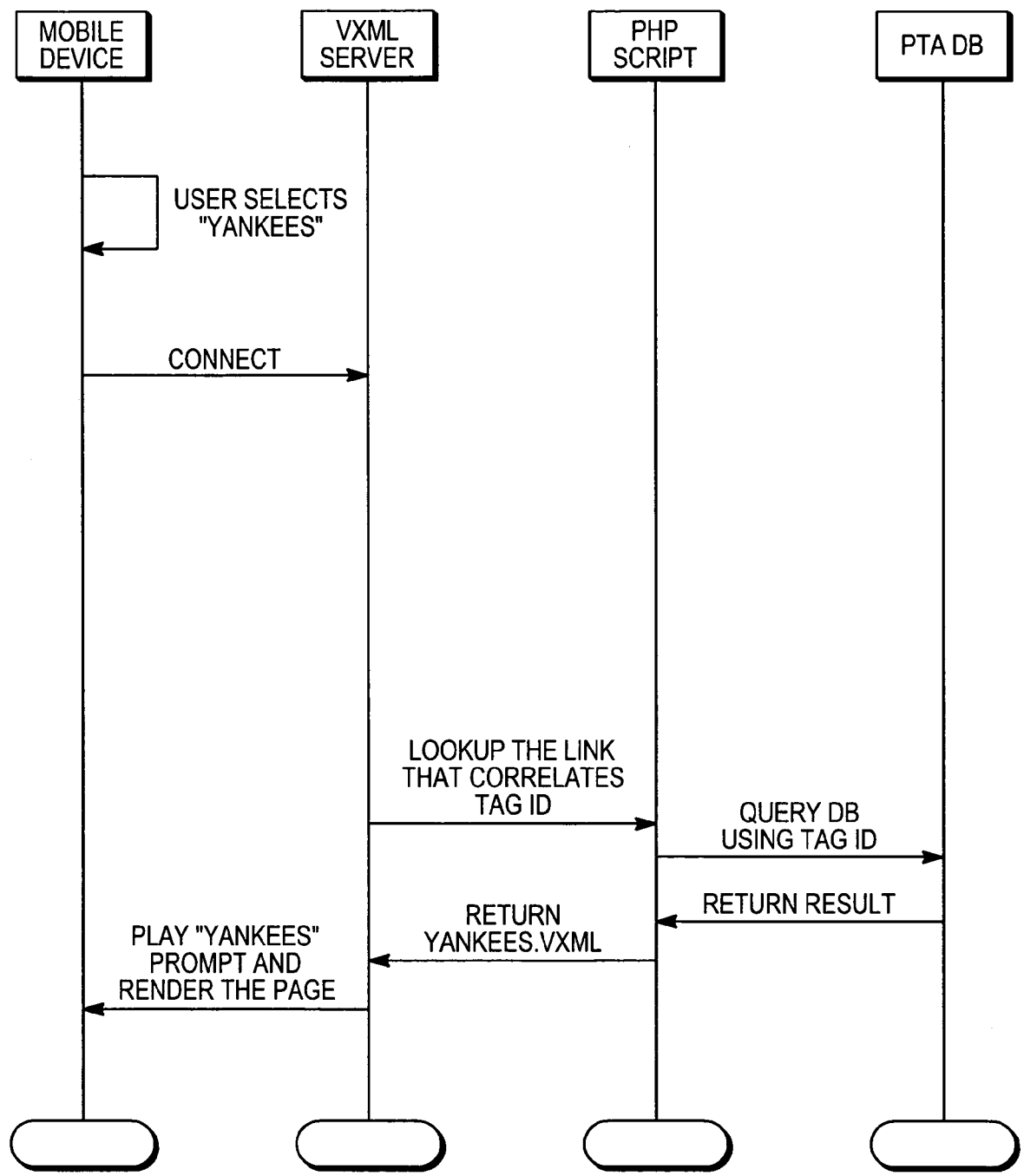
FIG. 8 is a message sequence diagram describing how the wireless device uses a PTT contact to retrieves a content page with the desired information.

FIG. 8 shows how the scripting language Hypertext Preprocessor (PHP) chosen to retrieve a v-Tag, specifically using MySQL functions, provides an easy mechanism to login, query, and add entries into the database.

FIG. 8 describes how to retrieve a stored v-Tag from the TAG table when a user requests a vTag's content page. The user selects a PTA contact from the PTT contact list. The handset connects to the VXML server and the PTA application is started and the information node is retrieved. The link lookup begins and is sent to the .VXML server to be rendered and played back to the user.

The method described herein may be used for launching different services based on the contact type, including selecting a Push-To-Talk (PTT) contact using one user interface event that triggers a standard PTT call or a connection to a machine such as a Push-To-Ask (PTA) Platform dependent on the contact type from the wireless communications device. The Push-To-Ask Platform may comprise an Interactive Voice Response (IVR) system and the necessary components to retrieve the content or information requested in a transaction.

The Push-To-Ask (PTA) encoding of the contact type shall be transparent to the user when viewing the contact in the handset. A PTA contact allows direct access to a node in the information system tree structure as defined in FIG. 9. The PTA contact may represent the information node or content, which includes traffic, news, sports, music, stocks, etc. as well as other services. A PTA contact may represent an "advertising contact" for the carrier or service provider. The handset shall be able to distinguish a PTA contact from a standard PTT contact. The PTA contact or contacts can be pre-loaded in the wireless communications device. The PTA contact can be added or modified by the service provider or carrier. The PTA contact can be added or modified through a web interface or web portal. The PTA contact can be added or modified by through the wireless communications device interface. The PTA contact can be added or modified by means of a command, voice or key press, during the Push-To-Ask session.

The method for interacting with the PTA services can change based on the user event, for example:

a. Selecting a PTA contact using the PTT button triggers a half-duplex session resulting in using the PTT key to interact with the Push-To-Ask Platform b. Selecting a PTA contact using the SEND button triggers a full-duplex session with the Push-To-Ask Platform.

c. Selecting a PTA contact using the PTT button press and immediate release triggers a half-duplex session resulting in the interaction with a particular service of type A of the Push-To-Ask Platform.

d. Selecting a PTA contact using the PTT button while press and holding the button for some duration of time triggers a half-duplex session resulting in the interaction with particular service of type B of the Push-To-Ask Platform.

e. The differentiating services can be configured in the PTA encoding of the contact type.

The Push-To-Ask System may comprise an Interactive Voice Response (IVR) server, the user's wireless communications device, group list management server (GLMS), database or databases, and a communication network. The Push-To-Ask Platform may have an interface with the GLMS allowing PTT contacts, which represent the content and services (traffic, news, sports, music, stocks, etc.), to be added to the user's PTT contact list. Managing the PTA contacts, which represent information nodes of the menu system, may be done by the group list management system (GLMS). Any necessary mapping of PTA contacts to information nodes may be stored in a database.

The mechanism to add a PTA contact or v-Tag the content may be triggered by a user event, for example:

a. The user may say a specific command such as "v-Tag" to trigger the specific action of requesting the information node to be added as a PTA contact during a PTA session.

b. The user may use a defined key press to trigger the specific action of requesting the information node to be added as a PTA contact during a PTA session.

c. The specific action may engage the interaction between the PTA Platform and the GLMS to add or modify the PTA contact d. The specific action may engage any necessary interaction between the PTA Platform and the PTA mapping database.

e. Depending on the architecture, the actions may all take place within the PTA Platform.

The mechanism to retrieve the information node involves user interaction with the PTA System, including:

a. Selecting a PTA contact.

b. The handset may communicate over a communication network and connect to an IVR system.

c. The IVR system may retrieve the information node based on the input from the PTA contact (i.e. the connected number, DTMF tone, URI, transmitted audio burst etc.)

A method for a dynamic PTA contact shall shows relevant information about the information node. The PTA contact may contain the current sports score, stock quote, weather, etc. in the contact name. Selecting the dynamic PTA contact using the methods described in [0047] shall allow the user to retrieve the content or service from the information node.

In summary, a push-to-talk (PTT) communication is made to the server to access an automated menu based information database containing the information. More specifically, a PTT device, e.g., a PTT enabled handset, has a Push-to-Ask (PTA) contact that will connect to an Interactive Voice Response (IVR) system. This process can enhance common phone inquiries (news, stocks, weather, etc.) as well as open the door for new applications that utilize Automatic Speech Recognition (ASR), such as a translator service, a "To Do List", etc. PTA allows users to access content with a press of a button and with Voice-Tag (v-Tag) capabilities users can customize there PTA contact list with content they want to access in a press of a button. Utilizing the group list management system (GLMS) used by PTT, users and carriers can add new contacts into the contact list with minimal effort by using the system described in this document. Associating PTA with the PTT experience of pressing the button to talk naturally eliminates unintentional background noise while suppressing the voice of the machine, pre-recorded speech or Text-to-Speech (TTS), allowing users to control the conversation that is not found in traditional IVR use cases.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. A method for retrieving information from a server to a wireless communications device, comprising:
    selecting a contact from at least one contact in the wireless communications device;
    establishing a push-to-talk communication to the server to access an automated menu based information database containing the information;
    traversing a menu of options in the automated menu based information database;
    selecting one of the options;
    receiving the information by the wireless communications device;
    tagging by a user the option selected by one of a voice response or a key press; and
    updating the list of contacts in the wireless communication device to include the option tagged.

2. The method of claim 1 wherein the tagging step comprises connecting to a push-to-ask platform including an interactive voice response system.

3. The method of claim 2 wherein the tagging step comprises selecting a push-to-ask contact using the push-to-talk contact.

4. The method of claim 3 wherein the tagging step comprises triggering a half-duplex session.

5. The method of claim 1 wherein the tagging step comprises connecting to an information tree structure.

6. The method of claim 1 wherein the tagging comprises one of voicing a statement or pressing a key on the wireless communication device.

7. A method for retrieving information from a server to a wireless communications device, comprising:
    a. connecting to the automated menu based information database from the wireless communications device;
    b. receiving one or more options from the automated menu based information database;
    c. selecting one of the options that points to the information;
    d. receiving the information from the automated menu based information database by the wireless communication device;
    e. transmitting a tag initiated by a user to the automated menu based information database to obtain a locater identifying the selected option in the database;
    f. receiving the locater of the selected option by the wireless communications device; and
    g. making the locater selectable from the wireless communications device.

8. The method of claim 7 wherein the transmitting step comprises connecting to a push-to-ask platform including an interactive voice response system.

9. The method of claim 8 wherein the transmitting step comprises selecting a push-to-ask contact using the push-to-talk contact.

10. The method of claim 9 wherein the transmitting step comprises triggering a half duplex session.

11. The method of claim 7 wherein the transmitting step comprises connecting to an information tree structure.

12. The method of claim 7 wherein the transmitting step comprises one of voicing a statement or pressing a key on the wireless communication device.

* * * * *